May 26, 1970  P. L. CAMPANARO ET AL  3,514,707
MEANS AND TECHNIQUES USEFUL IN BLANKING INTERFERENCE
Filed April 25, 1967  3 Sheets-Sheet 1
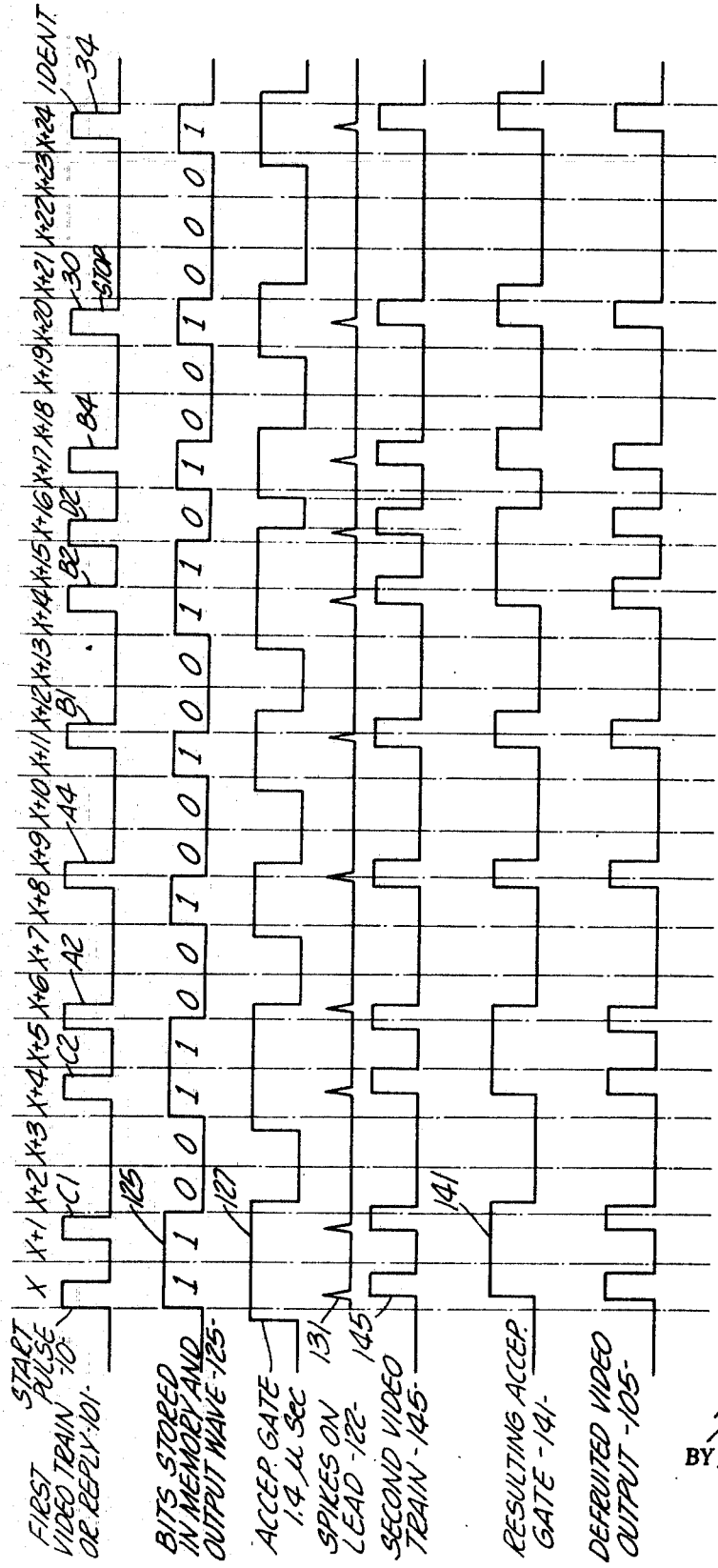
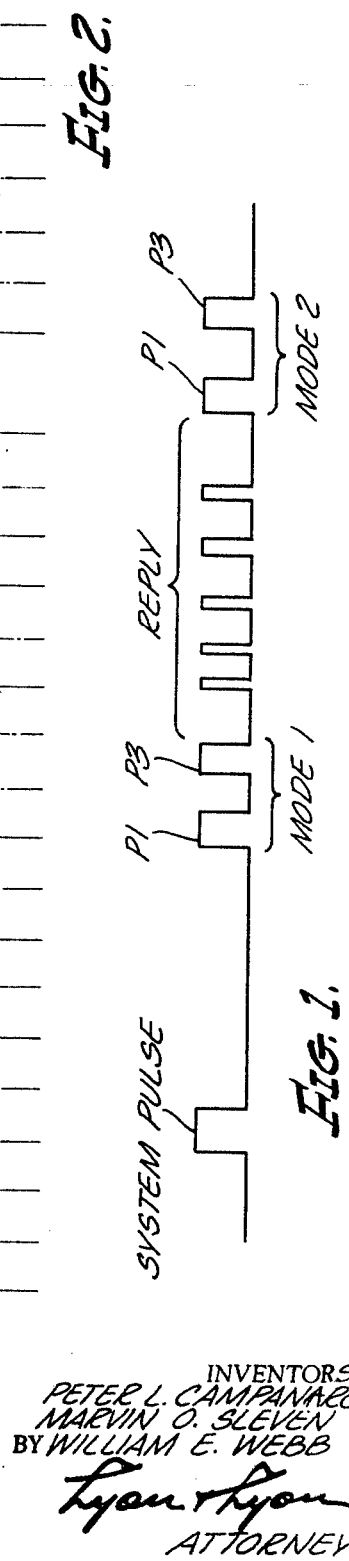
INVENTORS.
PETER L. CAMPANARO
MARVIN O. SLEVEN
BY WILLIAM E. WEBB
Lyon & Lyon
ATTORNEYS

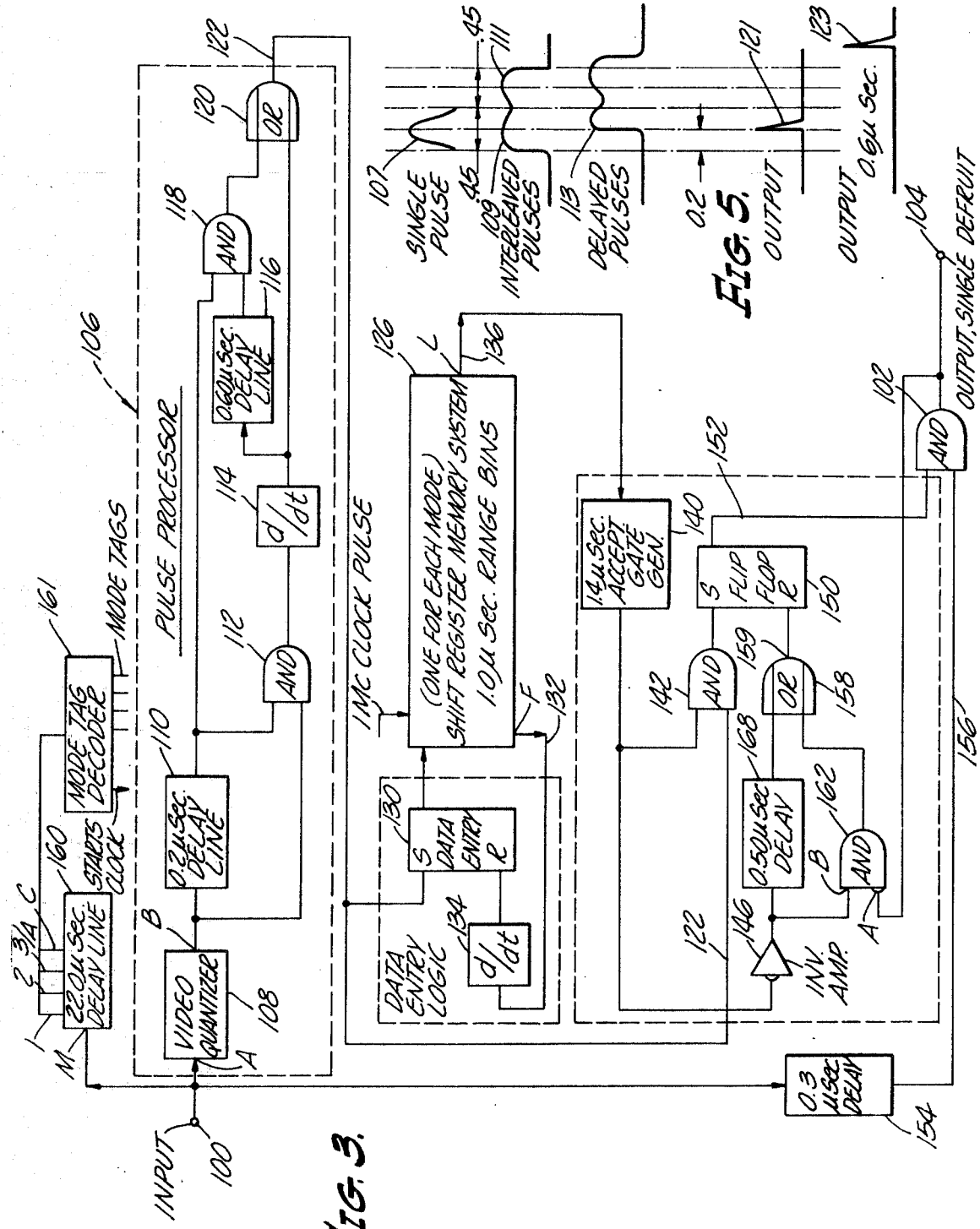

3,514,707
MEANS AND TECHNIQUES USEFUL IN
BLANKING INTERFERENCE
Peter L. Campanaro, Chatsworth, and Marvin O. Sleven and William E. Webb, Los Angeles, Calif., assignors to Whittaker Corporation, a corporation of California
Filed Apr. 25, 1967, Ser. No. 633,625
Int. Cl. H03b 1/04
U.S. Cl. 328—165                                     7 Claims

ABSTRACT OF THE DISCLOSURE

An IFF System using shift register memory in which individual pulses of IFF responses are stored as binary quantities and compared with subsequent IFF response pulses on a pulse-to-pulse basis to eliminate (defruit) undesired pulses either as a result of one such comparison (single defruit) or as a result of two comparisons (double defruit).

---

The present invention relates to an improved system for rapid identification of aircraft in areas of high aircraft density wherein there may be a plurality of sources transmitting interrogation signals, the present invention being directed more specifically to an improved defruiting system which serves in general to reject all signals produced in response to such interrogation signals except those signals which are in response to a particular interrogation source. Such rejection or defruiting is accomplished by rejecting nonsynchronous replies. Aircraft identification systems of this character are generally referred to as IFF or Secondary Surveillance Radar (SSR) systems, hereinafter referred to as IFF systems.

In the use of such IFF systems there may be many interrogator-responsors challenging asynchronously a number of aircraft, with each IFF receiver accepting replies in response to the associated interrogator as well as replies to other interrogators operating in the vicinity. The latter replies from such other interrogators are not synchronous to the associated interrogator and constitute a form of interference and such asynchronous replies are commonly referred to as "fruit" and the "defruiting" process as indicated previously herein involves the rejection of such asynchronous replies or signals.

It is therefore a general object of the present invention to provide a novel defruiting means to improve IFF systems.

As described herein, the defruiter removes asynchronous replies received in IFF systems, such asynchronous replies occurring as a result of aircraft transponders being triggered by one or more interrogators other than the one associated with a particular PPI (Plan Position Indicator) display. Without a means of defruiting the asynchronous replies appear as "fruit" on the face of the cathode ray tube (CRT) forming a part of the PPI system thus making it extremely difficult for the IFF radar operator to detect valid replies. Such asynchronous replies, in the absence of defruiting means, may also garble valid target replies and thus another aspect of the present invention involves the rejection or elimination of such asynchronous replies so as to prevent garbling of valid target replies.

In accordance with important features of the present invention, the present defruiting means solves those problems indicated above by reeciving and conditioning all reply data during one range sweep of the IFF radar system and storing this information so received and conditioned in digital form. On the next succeeding radar range sweep the incoming reply data, i.e., real time video information in the form of pulses is compared with the previously stored information on a pulse-to-pulse basis.

Since the radar may interrogate and receive replies in different modes of operation, i.e. modes 1, 2, 3/A, C, etc., all references to a comparison of stored data with current data should be recognized to imply that similar modes are involved in the comparison. For true synchronous replies, a pulse appearing at a particular time along a range sweep in one mode of interrogation appears essentially at the same time, i.e., range, on the next succeeding interrogation in the same mode. Asynchronous pulses will most usually not appear at the same range on two successive interrogations of a particular mode and hence are rejected. This process of rejection or defruiting in accordance with important features of the present invention, involves a gating of the real time video being received with video that was stored in a previous interrogation in the same mode permitting synchronous incoming real time video to then appear at the defruiter output for subsequent data processing and/or on the face of the CRT in the PPI system.

A single defruit system and also a double defruit system are described and it will be seen that important features of the single defruit system are such that double defruiting may be accomplished by a modification which does not necessitate duplication of the storage system. Thus another important aspect of the present invention involves these features in the digital defruiter which allow it to be easily and inexpensively converted from a single defruit to a double defruit system in accordance with other features of the instant invention.

Another object of the present invention is to provide means and techniques of this character which receive reply data during one range sweep of the associated radar, store this reply data information in digital form and on the next radar range sweep, compare the new incoming real time video information with the previously stored information on a pulse-to-pulse basis whereby for true synchronous replies, a pulse at a given range on one mode interrogation appears at essentially the same range as on the succeeding interrogation of the same mode whereas, on the other hand, asynchronous pulses do not appear at the same range on two successive interrogations of the same mode and hence such asynchronous pulses are rejected, i.e., do not appear in the output of the defruiter. Thus, in the system described, the process of defruiting involves a gating of the real time video being received with video that was stored on a previous interrogation sweep of the same mode with coincident real time video then appearing at the defruiter output.

Another obect of the present invention is to provide a defruiting system of this character which will operate satisfactorily at a pulse repetition frequency (PRF) either varying or constant which is within a large range of values extending from essentially zero to an upper frequency which is limited only by the particular memory length used in the system. In that regard, another feature of the present invention allows change in memory length by the use of modular units involving, for example solid state digital memory cards.

Features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

FIG. 1 is a graphic representation of time occurrence of some pulses in a typical IFF system embodying features of the invention, the time spacing between pulses being for illustrative purposes and thus are not necessarily to scale;

FIG. 2 illustrates time occurrences of various pulses in the system shown in FIGS. 3 and 4;

FIG. 3 illustrates a single defruit system embodying features of the present invention;

Figure 4:
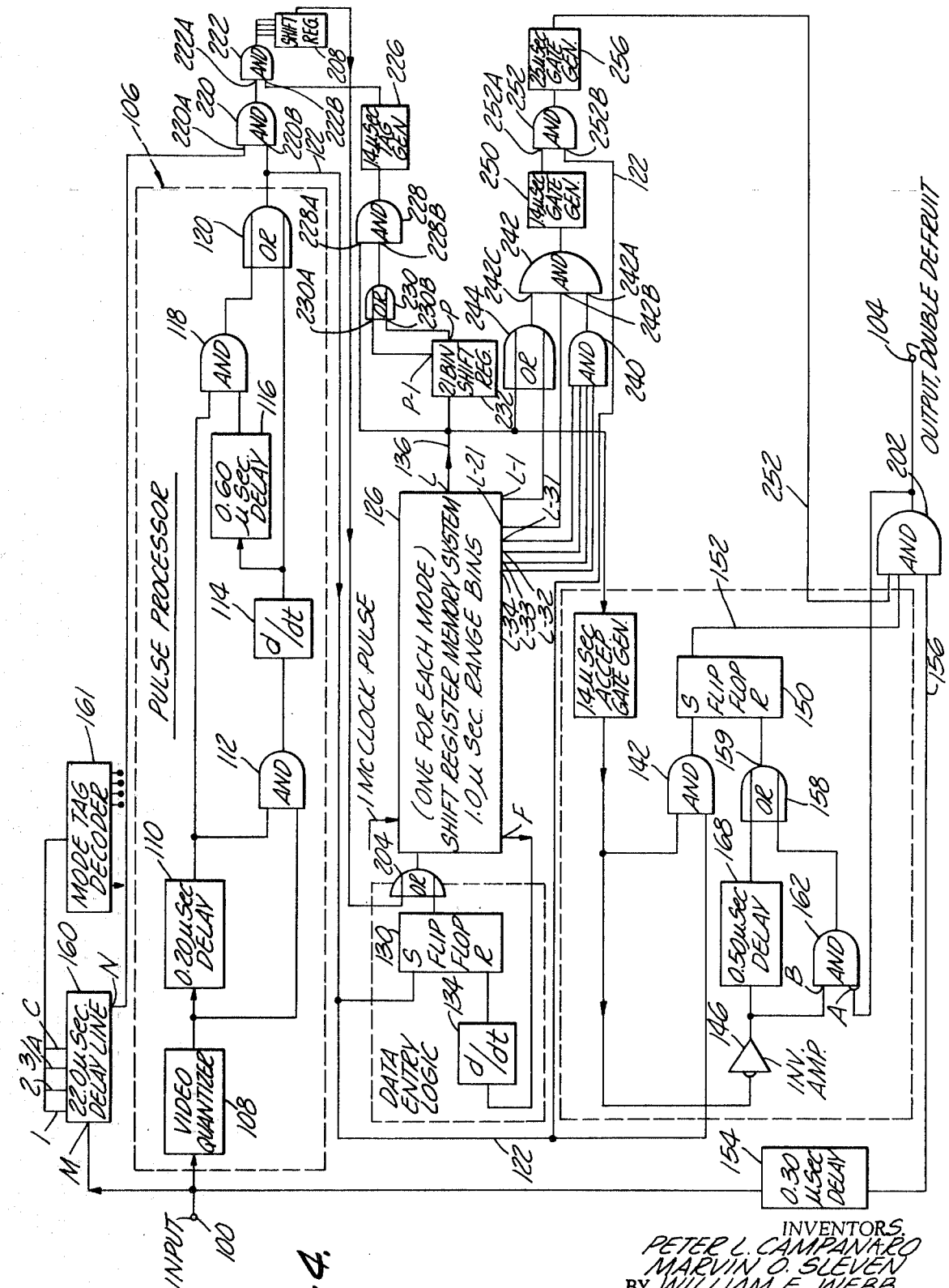
FIG. 4 illustrates a modification of FIG. 3 for accomplishing double defruiting.

In the usual IFF system, interrogation, as indicated in FIG. 1, involves the transmission of two time spaced pulses referred to as pulses P1 anl P3 and these pairs of pulses P1, P3, follow a main or system pulse from an associated radar system. These pulses P1 and P3 each may have a nominal width of 0.8 microsecond with a time spacing between the same being representative of a particular so-called interrogation mode. Such modes may, for example, be either so-called 1, 2, 3/A, B, C, or D when there is a corresponding time spacing of 3, 5, 8, 17, 21 or 25 microseconds. The pulse P1 may be referred to as a conditioning pulse and pulse P3 may be considered to be a triggering pulse. The IFF system may operate such that there may be, for example, 400 interrogations per second, there being one pulse pair P1, P3 per each interrogation. The particular information sought by the interrogation is established as indicated above by the time spacing between pulses, i.e., the particular mode. An aircraft receiving this mode information, i.e., pair of pulses P1, P3, replies and such reply is in the nature of a series of pulses which may, for example, be from 2 to 15 in number and spaced at different time intervals depending upon the information intended to be conveyed thereby. The first pulse of such series of reply pulses is usually transmitted by the aircraft within approximately 2 microseconds following receipt of the triggering pulse P3. The nominal width of each reply pulse may be, for example 0.45 microsecond.

In a typical IFF system, modes 1, 2, 3/A and C may be transmitted sequentially in any order followed by the next series usually in the same order. During the time normally allotted to the interrogation of an aircraft there may be, for example, ten to fifty pulse pairs P1, P3 transmitted. While interrogation is in the nature of pulse position modulation, the response is in the form of a pulse code modulation. Stated in somewhat different language, a reply initiated by the relative position of pulses in a pulse pair P1, P3 may be considered to be a pulse train in which Start and Stop pulses 10, 30 designated as such in FIG. 2 are 20.3 microseconds apart, wherein these Start and Stop pulses are illustrated with reference to a timing grid having 1.0 microsecond divisions, such divisions or spacings being referred to herein as range bins and designated for illustration as X to $X+24$. Thus, the Start and Stop pulses 10, 30 spaced in time by 20.3 microseconds may be seen to fall in corresponding range bins X, $X+20$ spaced 20 range bins apart; and the Stop pulse 30 is followed by an identification pulse also referred to sometimes as a caboose pulse or SPI pulse, which may be seen to fall in range bin $X+24$. Pulses of approximately 0.45 microsecond duration at each of the interior information positions may be present or absent to form, for example, two to the twelfth power ($2^{12}$) or 4096 codes, such information positions being spaced by 1.45 microseconds, the center information position being usually unused.

This designation of 1 microsecond range bins X to $X+24$ in FIG. 2 has significance with respect to a shift register memory system incorporated in and described later in relation to single and double defruiting systems wherein in each such system the memory system is provided with corresponding 1 microsecond range bins.

As seen in the single defruit system in FIG. 3, the video or train of reply pulses R corresponding to a particular mode, e.g., mode 1, 2, 3/A or C is applied to the input terminal 100 this video being a composite video which contains "fruit" or asynchronous signals, i.e., pulses which are in addition to those illustrated at 101 as being in the first video train or reply at the top of FIG. 2. This composite video signal is defruited by a gating process which involves the AND gate 102 and which functions to allow passage of only those signals represented at the top of FIG. 2 so as to achieve a defruited video output 105, FIG. 2, at output terminal 104 in FIG. 3, such defruited video 105 appearing on output terminal 104 being the same as that represented at 101 at the top of FIG. 2.

For these purposes, the incoming video on terminal 100 is processed in a pulse processer 106 which includes a video quantizer 108, a 0.20 microsecond delay line 110, an AND gate 112, a differentiator 114, a 0.60 microsecond delay line 116, and AND gate 118, and an OR gate 120 with pulse processing being accomplished as now described.

The quantizer stage 108 receiving a video pulse 107 (FIG. 5) at its input terminal A allows passage of signals to its output terminal B at full amplitude provided that the incoming signal is above a certain level below which level signals are rejected and do not appear at output terminal B. So-called noise resulting from high intensity pulses or spikes of less than 0.2 microsecond duration is rejected using the delay line 110 and AND gate 112 which has one of its input terminals connected to the output terminal B of quantizer and the other one of its input terminals connected to the output of the delay line 110. Thus, as indicated in FIG. 3, the AND gate 112 remains closed during this initial time of 0.2 microsecond during which noise spikes are expected and hence pulses only of duration greater than 0.20 microsecond appear at the output terminal of the gate 112, such output signal is applied to the differentiator stage 114 which serves to produce a sharp pulse or spike corresponding to the leading edge of the pulse applied to its input terminal; and this sharp pulse is applied to the lead 122 through the OR gate 120. In the event that there are nearly overlapped pulses on terminal A as indicated at 109, 111 in FIG. 5, which results only when the replies from two aircraft are received closely spaced in time, it is desirable that each of such pulses results in a corresponding spike 121, 123 on lead 122 and this is assured by applying the output of the AND 118 to the other input terminal of the OR gate 120 with one input terminal of gate 118 receiving the output 121 of differentiator through the 0.60 microsecond delay line and with the other input terminal of gate 118 receiving an input 113 from the output of delay line 110. Thus there is a spike on lead 122 for each leading edge of pulse 109 together with one spike for each nearly overlapped pulse 111.

Each of these spikes or sharp pulses on lead 122 is recorded as a binary 1 in a shift register memory system 126 having for example, one microsecond range bins as indicated previously, this one microsecond value being established by the frequency of the clock pulse applied to such memory system, e.g. one megacycle in this example.

To store or record this information, i.e., the existence or absence of spikes on lead 122 at successive one microsecond time intervals, such spikes on lead 122 are applied to the Set (S) input terminal of the data entry flip-flop circuit 130 having its output terminal connected to an input terminal of the memory system 126. A spike on lead 122 sets the flip-flop and it is reset upon acceptance of a "1" by the first shift register cell from which a signal is applied via lead 132 and differentiator stage 134 to the reset terminal (R) of the flip-flop 130. The flip-flop 130 remains in a binary one stage until the first cell in the shift register 126 assumes a "one" condition in which case the reset pulse is produced and applied in differentiated form to terminal R.

The number of storage bins in the shift register 126 is proportional to the operating range of the radar system. Thus, for example, when the operating range is 200 miles, this corresponds to a radar time of 2440 microseconds (round trip) and in the example of a one MHz. (megacycle) clock rate the shift register 126 includes 2440 storage bins each of which is referred to as a one microsecond range bin.

The condition of the range bins as a result of the example input code train 101 is represented in 125 of FIG. 2 by the numerals 1 and 0, and it will be seen that the Start pulse 10 produces a 1 condition in range or storage bin X; the pulse C1 produces a 1 condition in range bin $X+1$. A 0 condition prevails in range bins $X+2$ and $X+3$ since no part of a video input pulse is found in the corresponding time intervals. A C2 video pulse produces a 1 condition in range bin $X+4$. Conditions in range bins $X+5$ and $X+6$ are of interest because the pulse A2 has a portion in each of such range bins; however, since a differentiated signal, i.e., a sharp spike, is desired from the leading edge of pulse A2 as previously described in connection with FIG. 5, for purposes of actuating the shift register pulse A2 produces a 1 condition in bin $X+5$ and a zero condition in bin $X+6$. Thus it may be stated that if the leading edge of any of the pulses of the code train falls within a range bin, it produces a one condition in only that one range bin. The pulse D2 has only a very small portion thereof extending into range bin $X+15$ and serves to illustrate the desirability of "stretching" in the acceptance gate as described in more detail later. This desirability arises when one considers the fact that a differentiated voltage has some finite rise time before a voltage or current is produced of sufficient amplitude to set a flip-flop. As a result of these 1 and 0 conditions established in the shift register during read-in, a voltage or current condition exists during read-out at the output terminal or lead 136 as indicated by the wave form 125 which has a time duration corresponding to the range bin. This wave form appearing on lead 136 is applied to the input terminal of a leading edge acceptance gate generator 140 which is essentially a pulse stretcher for purposes of producing a gating voltage 127 (FIG. 2) which embraces both the leading and trailing edges of the wave form 125, the amount of overlap at each edge being approximately 0.2 microsecond. This wave form 127 is applied to one terminal of AND gate 142 and also to the input terminal of inverting amplifier 146. The other input terminal of AND gate 142 receives the spikes of current reply pulses on lead 122, these spikes 131 in FIG. 2 represent the differentiated leading edge of pulses Start, C1, C2, etc., delayed however, by 0.2 microsecond as a result of the 0.2 microsecond delay line 110 in FIG. 3. The output terminal of AND gate 142 is connected to the Set (S) input terminal of the video acceptance gate flip-flop generator stage 150 which operates to produce a "one" condition on its output lead 152 when there is a coincident condition in the AND gate 142. The composite video appearing on input terminal 100 is applied to the other input terminal of the AND gate 102 through the centering delay network 154 having a delay of approximately 0.3 microsecond, such delay network 154 providing a compensation for the delay of 0.20 microsecond in delay line 110 and also approximately 0.10 microsecond relay inherent in the remaining circuitry.

It will be seen that the resulting acceptance gate 141 (FIG. 2) produced as a result of data stored on a previous interrogation of the same mode and appearing on lead 152 coincides timewise with real time pulses on lead 156 in a succeeding cycle illustrated at 145 in FIG. 2, the same being illustrated to show that this real time input code train 145 may be displaced approximately 0.2 microsecond late as a result of jitter in the system without affecting the character of the defruited video output represented at 105. Thus, when so displaced as a result of jitter or otherwise, it will be seen that the defruited video output represented at 105 and appearing an output terminal 104 corresponds to the current video input code train gated by the previous reply code train at the same range which was stored and subsequently used in developing gating voltages. It is clear that had the pulse trains been asynchronous, i.e. not at the same range, the output of the leading edge acceptance gate generator 140 would in general not be coincident with the spikes produced by current reply pulses. Thus no video acceptance gates would be generated and no video output pulses would appear at 104.

The flip-flop circuit 150 is reset by the output developed at the OR gate 158 which has two input terminals and one output terminal 159 connected to the reset terminal (R) of the flip-flop circuit 150. The first input terminal of the OR gate 158 is connected to the output terminal of the AND gate which has one of its input terminals connected to the output terminal of the inverting amplifier 145, the input terminal of the same amplifier 146 being connected to the output terminal of the gate generator 140 to apply the wave form 127 (FIG. 2) in inverted form to such terminal of the AND gate 162. The voltage an output terminal 104 is applied in inverted form to the other terminal of AND gate 162 so that the necessary voltage at the input terminal of OR gate 158, necessary to reset flip-flop 150 requires two conditions to be fulfilled, namely, (1) that there be no video signal at the video output terminal 104 whereby a "zero" is produced at the lower input (inhibiting) terminal A of "NOT AND" gate 162 and (2) that the acceptance gate 127 be absent, whereby a "one" is produced at the other input terminal B. The output of OR gate 158 is also a "one," i.e., the flip-flop 150 may be reset, when a signal is transferred from the output of inverting amplifier 146 through the 0.50 microsecond delay line 168 to the upper terminal of OR gate 158. Through the process described above the video acceptance gate is terminated at the end of the leading edge acceptance gate, provided that the current video pulse being gated has previously terminated. In the event that the current video pulse is still present upon termination of the leading edge acceptance gate, reset of the video gating flip-flop 150 is delayed until the video pulse is terminated up to a maximum of 0.5 microsecond after termination of the leading edge acceptance gate.

As alluded to previously, there is one shift register memory system 126 for each interrogation mode. Circuitry is provided which determines the current interrogation mode and correspondingly programs the information storage to aid read-out from the proper memory. A 22.0 microsecond tapped delay line 160, and a mode tag decoder 161 which are common to each of the four modes and are for the purpose of isolating individual pulse pairs $P_1$, $P_3$ (FIG. 1) and identifying a corresponding mode and using the decoded mode pair trigger to start the 1 megacycle clock signal, such one megacycle clock signal being applied to the corresponding shift register 126 for sequentially recording the incoming data supplied to it from flip-flop 130 on a pulse-to-pulse basis and for shifting such data sequentially to next adjacent bins therein and ultimately to the last bin therein from which it is read out and appears as a pulse on lead 136.

For these purposes the tapped delay line 160 has its input terminal connected to input terminal 100 to receive the composite video train which includes, of course, not only the reply pulses but also the system pulse and the mode identifying pulse pair $P_1$, $P_3$. The pulse pairs for modes 1, 2, 3, 3/A, C are derived from taps on and spaced along the delay line 160 as indicated in FIG. 3, the physical spacing of taps on the delay line along its length corresponding to the time spacing between corresponding pulse pairs $P_1$, $P_3$. The signals so delayed are applied to the mode tag decoder 161 which develops signals each characteristic of the particular mode which is being detected.

Comparing the single defruit system of FIG. 3 in which the AND gate 102 has two inputs with the double defruit system of FIG. 4 in which the corresponding AND gate 202 has three inputs such gate 202 now requires simultaneous fulfillment of three conditions instead of two conditions, the third added condition involving the fact that the real time video appearing on lead 156 is compared not only with the signals developed on lead 152, but is compared also with signals developed on lead 252, such signals on lead 252 being derived using stored video information obtained from a reply train which is previous to the reply train used in deriving the signals on lead 152. There is thus essentially a double gating hence the term "double defruiting."

For ease of comparison those elements in FIG. 4 different from or added to FIG. 3 are characterized by a reference numeral in the 200 series. These differences and additions may be summarized as follows: AND gate 202 in FIG. 4 differs from AND gate 102 in FIG. 3 as mentioned previously; the output of flip-flop 130 in FIG. 4 instead of being applied directly to the input of shift register 126 is now applied thereto through OR gate 204 which receives an input from a prememory system 208 which is now associated with other elements having reference numerals in the 200 series.

Signals are derived from additional bins in the register 126 in that whereas in the single defruit system an output signal from only the last bin L and a reset signal from the first bin F are used, in the double defruit system, additional output signals are derived from other bins spaced 1, 21, 31, 32, 33 and 34 bins immediately forwardly of the last bin L and these are correspondingly designated as L–1, L–21, L–31, L–32, L–33 and L–34 bins respectively.

The choice of these particular additional bins involves the time spacing between the Start and Stop pulses 10, 30 (FIG. 2) and it will be seen that when information produced by a Start pulse 10 is shifted through the register 126 and ultimately appears in bin L or L–1 the information produced by the subsequent Stop pulse 30 after like shifting appears in bin L–21. Bin L or L–1 has reference to a Start pulse and bin L–21 has reference to a Stop pulse, which together bracket a code train which will produce the signals applied via lead 136 to the acceptance gate generator 140. The four bins L–31, L–32, L–33 and L–34 correspondingly have reference to a train of four succeeding pulses each spaced one microsecond apart with the first of such four pulses being spaced ten microseconds following the Stop pulse, such train of four pulses, termed tag pulses, for identification purposes being introduced as described later in relation to the prememory system 208 wherein such train of four pulses is developed.

The current video on input terminal 100 as before in single defruiting is applied to the input terminal of delay line 160 and, in double defruiting, an output is derived from tap N which is spaced 20.3 microseconds from input tap M which means that the incoming video applied from tap N to terminal 220A of AND gate 220 is delayed a period equal to the time between Start and Stop pulses and that at the time a delayed Start pulse appears on such input terminal 220A a substantially undelayed signal derived from the Stop pulse appears at the other input terminal 220B which is connected to lead 122 thereby satisfying one condition of AND gate 222 which has its other input terminal 222B receiving the output of a tag generator 226 which develops a 1.4 microsecond pulse when two conditions are established at the input terminals 228A, 228B of AND gate 228. Terminal 228A is connected to lead 136 and thus one condition is met when a pulse appears on lead 136. Terminal 228B is connected to the output terminal of OR gate 230 having its input terminals 230A, 230B connected respectively to the twentieth, P–1 and twenty-first, P, cells of a twenty-one bin shift register post memory system 232 having its input terminal connected to lead 136. It will be seen that when a signal is developed on lead 136 as a result of information representative of a stored stop pulse being shifted out of the last bin in register 126, like information representative of a previously appearing start pulse being shifted out of either bin P–1 or P of register appears at either terminal 230A, 230B of OR gate 230 and thus the AND gate 228 is rendered effective to cause a 1.4 microsecond tag gate to be produced in generator 226 and applied to the other terminal 222B of AND gate 222 having its output terminal connected to each of four successive bins for parallel or simultaneous data entry into such four successive bins such that four "ones" are recorded in the shift register 208 following a code train entered in register 126. These four successive "ones" are clocked out of the shift register 208 and applied in succession through OR gate 204 for recording in corresponding four successive bins of register 126. For these purposes the shift register 208 may be a 14-bin register so that the first of these four tag pulses appears 10 bins later, i.e., 10 microseconds later, it being understood, of course, that data is recorded and read out of each of the shift registers herein in synchronism and at the same rate, i.e., one megacycle rate.

A tag comprising four successive pulses provides sufficient identification since a normal interrogation is not so coded as to include four successive pulses. These four identifying pulses or tag pulses are shifted to successive bins in register 126 and when they appear at bins L–31, L–32, L–33 and L–34 all four conditions required by AND gate 240 having its output connected to input terminal 242A of AND gate 242 is satisfied to likewise satisfy one of the three conditions imposed by such gate 242. A second condition imposed by gate 242 is satisfied since its input terminal 242B is connected to bin L–21 (10 bins or microseconds from bin L–31) in which information representative of a stop pulse is stored. The third condition imposed by gate 242 is also satisfied since its input terminal 242C receives the output of OR gate 244 having one of its input terminals connected to the last bin L and the other one of its terminals connected to the next-to-last bin, L–1, so as to assure a signal representative of a Start pulse, information of which at that time may be either in bin L or bin L–1 because the spacing between the Start and Stop pulse is 20.3 microseconds, i.e., involves a fractional part of a microsecond and involves the same considerations used in providing the OR gate 230 associated with two adjacent bins P and P–1 of register 232. When these three conditions are thus met a 1.4 microsecond duration pulse or gate is developed in gate generator 250 having its output terminal connected to input terminal 252A of AND gate 252 having its other input terminal 252B connected to lead 122 to receive the output of OR gate 120 and when a pulse responsive to a Start pulse appears on lead 122 the 25 microsecond gate generator 256 is caused to develop a gating voltage of that 25 microsecond duration on lead 252 to satisfy the added condition imposed in double defruiting by the three terminal input AND gate 202 in FIG. 4.

The operation of the system may be summarized as follows. At the beginning of an interrogation cycle when mode information of the character shown in FIG. 1 is being received, either from separated mode signals or from a decoding delay line, a Start pulse resulting from detection of a mode pair, $P_1$, $P_3$, starts a timing oscillator. Pulses from such oscillator may be counted down to provide a basic clock rate, e.g. one megacycle, and these clock pulses may be processed by a clock generator to produce several phases of the clock which are used for various functions throughout the defruiter system. For example, when the oscillator has been started by detection of a mode pair, pulses from the clock generator may be used to step a range counter. The range counter which counts out the number of bits corresponding to the selected maximum range of the particular radar in use may be used to stop the oscillator and thus prevent the insertion of any additional video pulses.

As information is being entered into a memory bank from the current interrogation cycle, information from the previous interrogation cycle of the associated mode is being read out of the memory bank. These memory banks operate essentially as very long shift registers. As pulses are read out of memory, they are stretched, both the leading and trailing portions, in order to assure bracketing of the current video data pulses to allow for the small amount of jitter which can be expected in synchronous pulses from one interrogation cycle to the next. Thus the stretched pulse, referred to as the digital acceptance gate, is used to gate the synchronous real time video information received during the current interrogation cycle. Whenever the leading edge of the current video pulse starts within the digital acceptance gate but continues beyond the trailing edge of the digital acceptance gate a video acceptance gate is formed which permits the entire current video pulse to be passed to the defruiter output. The video acceptance gate is however limited to extending a maximum of 0.5 microsecond beyond the digital acceptance gate.

In this above-indicated single defruit system of FIG. 3, the pulses from two successive interrogation scans of the same mode are compared to produce the output from the unit. In the double defruiting system of FIG. 4, the data from three successive interogation cycles are compared to produce the output from the defruiter.

In the double defruiting system of FIG. 4, during the first interrogation cycle, the real time video information is read in and is stored in a memory bank, as in the single defruit mode of operation of FIG. 3. During the second interrogation cycle, the information read out of the memory bank is compared with the real time video information. If the information compares and the reply message is found to be synchronous, a tag is entered into the memory bank. Simultaneous with this comparison and the tag generation, the real time video information from the second cycle of interrogation is entered into the memory bank. During the third cycle of interrogation, the data read out from the memory bank is compared with the real time video, and at the same time a signal is generated to indicate whether or not a tag is present in memory. If a tag is present, then the message from memory is compared with the real time video and it is allowed to generate an output from the unit. This effectively produces a double defruit operation with the use of only one memory bank for each interrogation mode. The generation of this tag, its entry into the memory and its subsequent decoding from memory, may be controlled by a switch within the defruiter unit to provide either single or double defruit operation to optimize the performance of the unit of the particular radar site where it is being used.

While particular embodiments of the present invention have been shown and described, it will be obvious to those skilled in the art that changes and modifications may be made without departing from the invention in its broader aspects.

We claim:

1. In a system of the character described wherein successive pulse trains, each containing recurrent synchronous pulses as well as asynchronous pulses in the same train are present, and it is desired to eliminate said asynchronous pulses from said recurrent synchronous pulses, the combination including means for producing successive pulse trains including a synchronous pulse in each train, a digital memory system having an input circuit coupled to said means and receptive to said pulse trains, said memory system having a plurality of successive time spaced bins, clock means controlling said bins in accordance with information as to the presence or absence of a pulse at a particular time during each of said pulse trains and serving to successively transfer from said input circuit to the output circuit of said memory system a received one of said synchronous pulses after being delayed a time commensurate with the appearance of a corresponding received synchronous pulse in a succeeding train, means sensitive to the leading edge of a synchronous pulse for locating such pulse in a bin having a time duration within which said leading edge appears, and means having an input circuit coupled to and responsive to pulses from both said producing means and said memory system output circuit and functioning to produce on a pulse-to-pulse basis an output representative of a true coincident condition existing between pulses from said producing means and delayed pulses from said output circuit.

2. A system as set forth in claim 1 including pulse processing means coupled between said pulse train producing means and said input circuit of said memory system, said pulse processing means including a first "AND" gate having a first input and a second input circuit and an output circuit; a second "AND" gate having a first input circuit and a second input circuit and an output circuit; an "OR" gate having a first input circuit and second input circuit and an output circuit coupled to said input circuit of said memory system; a first delay means having an input circuit and an output circuit; a second delay means having an input circuit and an output circuit; pulse differentiating means having an input circuit and an output circuit; said first input circuit of said first "AND" gate and said input circuit of said first delay means being coupled to said pulse train producing means; the output circuit of said first delay means being coupled to the first input circuit of said second "AND" gate and also to said second input circuit of said first "AND" gate; said output circuit of said first "AND" gate being coupled to the input circuit of said differentiating circuit which has its output circuit coupled to the input circuit of said second delay means and also to said first input circuit of said "OR" gate; said output circuit of said second delay means being coupled to said second input circuit of said second "AND" gate which has its output circuit coupled to said second input circuit of said "OR" gate; said second delay means producing a greater delay in transmission of pulse than said first delay means.

3. A system as set forth in claim 1 in which the last mentioned means functioning to produce an output is coupled to the output circuit of said memory system through circuit means including in combination; an acceptance gate generator having an input circuit coupled to the output circuit of said memory system and functioning in response to reception of memory bin output pulses to produce elongated overlapping output pulses which start earlier and terminate later than said memory bin output pulses; an "AND" gate having a first input circuit coupled to the output of said acceptance gate generator, said "AND" gate having a second input circuit coupled to said pulse train producing means by said pulse processing means; and the output of said "AND" gate being coupled to an input circuit of said last mentioned means which has a second input circuit; a delay means interposed between said second input circuit and said pulse train producing means.

4. A system as set forth in claim 1 in which the last mentioned means functioning to produce an output includes an "AND" gate having three input circuits, one of which is receptive to gating pulses resulting from a first train of pulses, a second of which is receptive to pulses of a succeeding second train of pulses, a third of which is receptive to pulses of a next succeeding third train of pulses, the first and second train of pulses each being delayed a time commensurate respectively to the duration of a single and a double number of pulse trains with respect to said first pulse train; said last mentioned means having an output circuit in which a pulse appears upon a time coincident condition of a pulse in said first delayed, said second delayed and third pulse trains.

5. A system as set forth in claim 1 in which there is double defruiting including an "AND" gate having a first input circuit and a second input circuit and having an output circuit; said first input circuit being coupled to said pulse train producing means; delay means interposing a delay commensurate with the time interval between first and last pulses of a pulse group within the successive pulse trains coupled between said source and said second input circuit; a second "AND" gate having a first input circuit coupled to the output circuit of said first "AND" gate; said second "AND" gate having a second input circuit and an output circuit; a second digital memory system having input circuit coupled to the output circuit of said second "AND" gate; an "OR" gate having a first input circuit coupled to said pulse train producing means and having a second input circuit coupled to the output circuit of said second memory system; the output of said "OR" gate being coupled to said first memory system having a last bin and a plurality of bins preceeding the last bin through which successive pulses are effectively transferred in passage to the last bin which is the output of said first memory system; a third memory system having an input circuit coupled to the output of said first memory system; a third "AND" gate having a first input circuit coupled to the output of said first memory system and a second input circuit coupled to the output of said third memory system; the output of said third "AND" gate being coupled to said second input circuit of said second "AND" gate; gate generating means; the last mentioned means functioning to produce an output representative of a coincident condition including an "AND" gate having three input circuits, one of which is coupled to said pulse trains producing means, a second one of which is coupled to the output of the first mentioned memory system and a third one of which is coupled to the output of said gate generating means; and means coupled to and controlling said gate generating means in response to conditions at said output of said first memory system as well as said plurality of bins therein.

6. A system as set forth in claim 2 including video quantizing means coupled between said pulse train producing means and said pulse processing means for producing pulses of substantially equal amplitude.

7. A system as set forth in claim 3 in which the output of the last mentioned "And" gate initiates operation of a flip flop circuit having its output coupled to said last mentioned means, and means responsive to the output of said acceptance gate generator and the output of said last mentioned means preventing said flip flop from being reset during those times pulses from said source are present.

References Cited
UNITED STATES PATENTS

| | | | |
|---|---|---|---|
| 3,038,155 | 6/1962 | Le Parquier | 328—165 XR |
| 3,258,772 | 6/1966 | Humpherys | 343—17.1 |
| 3,386,077 | 5/1968 | Molho | 343—17.1 XR |

DONALD D. FORRER, Primary Examiner

S. T. KRAWCZEWICZ, Assistant Examiner

U.S. Cl. X.R.

328—110; 343—5, 17.1